Patented July 3, 1951

2,559,569

UNITED STATES PATENT OFFICE 2,559,569

MANUFACTURE OF BENZENE HEXACHLORIDE

Harold David Orloff, Detroit, Mich., assignor to Ethyl Corporation, New York, N. Y., a corporation of Delaware No Drawing. Application May 25, 1950,
Serial No. 164,299

8 Claims. (Cl. 260—648)

This invention relates to the manufacture of benzene hexachloride by reacting benzene and chlorine in the dark in the presence of selected additives.

Benzene hexachloride is a well-known commercial insecticide. At present it is made commercially by reacting benzene with chlorine in the presence of actinic light. While in general the present process is a successful one, there are certain inherent deficiencies due in part to the use of actinic light. For example, the structural materials must be transparent, usually of glass, which introduces a hazard into the operation. Such hazard is enhanced due to the fact that to obtain good operation the proportions of chlorine and benzene are close to or within the explosive limits. Furthermore it is difficult to obtain uniform lighting and thus some of the reaction space is lost. The use of transparent equipment also complicates cooling that is required for the reaction. Thus it is apparent, other things being equal, that if the reaction can be conducted in the dark a superior process is obtained.

Benzene and chlorine by themselves do not react in the dark. This reaction can be initiated in the dark by the use of organic peroxides. However, the rate of conversion to benzene hexachloride in the presence of organic peroxides is so low that such use has not been seriously considered for commercial operation.

It is therefore an object of my invention to provide a process for the reaction of benzene and chlorine in the dark in which the reaction rate is high.

I accomplish the above object by reacting benzene and chlorine in the presence of a mixture comprising an organic peroxide and an amine. By the use of amines in combination with the peroxides, reaction rates two to six times that obtainable by peroxides alone are readily accomplished.

Among the peroxides which can be used for my invention are cumene hydroperoxide, benzoyl peroxide, 2,2-bis(t-butylperoxy)-butane, di-tertiary butyl peroxide, ascaridole, peracetic acid, lauroyl peroxide and acetyl peroxide. Among the amines which can be used in my invention are cyclohexylamine, dipropylene triamine, tetraethylenepentamine, diethylenetriamine, dicyclohexylamine, piperidine, triethylamine, and phenylhydrazine.

The amount of each additive used is relatively small, being of the order 0.01 to 0.5 mole per mole of benzene. Each of the additives are generally added in about equal proportions although unequal proportions can be used. The temperature used is relatively unimportant although liquid phase operation is required. My temperature range is between 20 and 80° C., the preferred range being 40 to 70° C.

My invention can be further understood by referring to the following working examples:

In the first series of examples a solution of 100 milliliters of benzene (87.5 grams) containing 2.5 to 3.7 grams of chlorine were placed in a reaction vessel which excluded all light. At the end of one-half hour, during which the reaction temperature was maintained at 55° C., reaction products were removed and analyzed for benzene hexachloride and none was found.

In a similar test 0.1 mole per cent, based on the moles of benzene, of cumene hydroperoxide was added to the benzene-chlorine mixture. At the end of one-half hour, the reaction temperature being maintained at 55° C., an analysis of the product showed that 8.33 grams per liter of benzene hexachloride were formed. However, when the same amount of cumene hydroperoxide plus an equal amount of cyclohexylamine was used, at the end of the one-half hour test, 30.8 grams per liter of benzene, of benzene hexachloride was obtained which is almost 400 per cent more than that obtained when cumene hydroperoxide alone was used.

Similarly when benzoyl peroxide was used alone in the same quantity as the cumene hydroperoxide, only 11.9 grams of benzene hexachloride per liter of benzene were obtained. Likewise when an equal amount of dipropylenetriamine was used in conjunction with the benzoyl peroxide, 19.8 grams of benzene hexachloride per liter of benzene were obtained. Thus in this comparison an increase in rate of almost 200 per cent was obtained.

In similar tests a mixture of 2,2-bis(t-butylperoxy)-butane with each of the following amines, tetraethylenepentamine, diethylenetriamine, dipropylenetriamine and dicyclohexylamine resulted in each test of about a 500 per cent increase in rate of benzene hexachloride formed over that obtained when 2,2-bis(t-butylperoxy)butane was used alone.

Thus by using the mixture of additives of my invention the rate of formation of benzene hexachloride in the dark is commercially attractive and permits the use of safe structural materials, such as non-corrosive metals, thereby simplifying the operation as well as reducing the hazard involved in the present operation which requires the use of glass or similar fragile transparent materials.

The above examples are only illustrative of the results obtainable by my invention and other combinations of peroxides and amines can be used.

Among such combinations that can be used to obtain substantial reaction rates are the following: cumene hydroperoxide and piperidine, cumene hydroperoxide and dipropylenetriamine, cumene hydroperoxide and diethylenetriamine, cumene hydroperoxide and triethylamine, cumene hydroperoxide and dicyclohexylamine, benzoyl peroxide and triethylamine, benzoyl peroxide and dicyclohexylamine, benzoyl peroxide and diethylenetriamine, benzoyl peroxide and tetraethylenepentamine, benzoyl peroxide and phenylhydrazine, cumene hydroperoxide and cyclohexylamine, benzoyl peroxide and dipropylenetriamine, 2,2-bis(t-butylperoxy)butane and tetraethylenepentamine, 2,2-bis(t-butylperoxy)butane and diethylenetriamine, 2,2-bis(t-butylperoxy)butane and dicyclohexylamine.

I claim:

1. A process for the manufacture of benzene hexachloride comprising reacting chlorine and benzene in the dark in the presence of an organic peroxide and an amine under liquid phase conditions at a temperature between 20° and 80° C.

2. A process for the manufacture of benzene hexachloride comprising reacting benzene with chlorine in the dark in the presence of a mixture of additives, one of which is an organic peroxide selected from the group consisting of cumene hydroperoxide, benzoyl peroxide and 2,2-bis(t-butylperoxy)butane, and one of which is an amine under liquid phase conditions at a temperature between 20° and 80° C.

3. A process for the manufacture of benzene hexachloride comprising reacting benzene with chlorine in the dark in the presence of 2,2-bis(t-butylperoxy)butane and an aliphatic amine selected from the group consisting of tetraethylenepentamine, diethylenetriamine, dipropylenetriamine and dicyclohexylamine.

4. The process of claim 2 in which the amine is cyclohexylamine.

5. The process of claim 2 in which the amine is dipropylenetriamine.

6. The process of claim 2 in which the amine is tetraethylenepentamine.

7. The process of claim 2 in which the amine is diethylenetriamine.

8. The process of claim 2 in which the amine is dicyclohexylamine.

HAROLD DAVID ORLOFF.

REFERENCES CITED

The following references are of record in the file of this patent:

FOREIGN PATENTS

| Number | Country | Date |
| --- | --- | --- |
| 613,519 | Great Britain | Nov. 30, 1948 |

OTHER REFERENCES

Kharasch et al. "Jour. Org. Chem.," vol. 6, pages 810-17 (1941).